(12) United States Patent
Pavlov et al.

(10) Patent No.: US 6,746,049 B2
(45) Date of Patent: Jun. 8, 2004

(54) ADAPTIVE SEAT BELT TENSIONING SYSTEM

(75) Inventors: Kevin J. Pavlov, Livonia, MI (US); Stephen M. Stachowski, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 5 days.

(21) Appl. No.: 10/202,269

(22) Filed: Jul. 24, 2002

(65) Prior Publication Data
US 2004/0017073 A1 Jan. 29, 2004

(51) Int. Cl.⁷ .......................... B60R 22/48; B60R 22/34
(52) U.S. Cl. ........................ 280/803; 280/807
(58) Field of Search ................ 280/803, 806, 280/807; 297/478, 480

(56) References Cited

U.S. PATENT DOCUMENTS

| | | |
|---|---|---|
| 4,722,550 A | 2/1988 | Imaoka et al. |
| 4,924,162 A | 5/1990 | Sakamoto et al. |
| 4,994,972 A | 2/1991 | Diller |
| 5,040,118 A | 8/1991 | Diller |
| 5,219,704 A | 6/1993 | Kim |
| 5,244,231 A * | 9/1993 | Bauer et al. ............... 280/807 |
| 5,263,765 A | 11/1993 | Nagashima et al. |
| 5,320,409 A | 6/1994 | Katoh et al. |
| 5,377,108 A | 12/1994 | Nishio |
| 5,398,185 A | 3/1995 | Omura |
| 5,552,986 A | 9/1996 | Omura et al. |
| 5,605,202 A | 2/1997 | Dixon |
| 5,707,109 A | 1/1998 | Massara et al. |
| 5,718,451 A | 2/1998 | White |
| 5,788,281 A | 8/1998 | Yanagi et al. |
| 5,873,599 A | 2/1999 | Bauer et al. |
| 5,890,084 A | 3/1999 | Halasz et al. |
| 5,906,393 A | 5/1999 | Mazur et al. |
| 6,012,008 A | 1/2000 | Scully |
| 6,084,314 A | 7/2000 | McCurdy |
| 6,128,562 A | 10/2000 | Gering |
| 6,142,524 A | 11/2000 | Brown et al. |
| 6,182,783 B1 * | 2/2001 | Bayley .................. 180/282 |
| 6,216,070 B1 | 4/2001 | Hayashi et al. |
| 6,230,088 B1 * | 5/2001 | Husby .................. 701/45 |
| 6,259,042 B1 * | 7/2001 | David .................... 177/136 |
| 6,260,879 B1 | 7/2001 | Stanley |
| 6,293,582 B1 | 9/2001 | Lewis |
| 6,295,495 B1 | 9/2001 | Morman et al. |
| 6,447,011 B1 * | 9/2002 | Vollimer ................. 280/806 |

FOREIGN PATENT DOCUMENTS

WO   WO 02/43531   6/2002

* cited by examiner

*Primary Examiner*—Robert P. Swiatek
(74) *Attorney, Agent, or Firm*—John E. Kajander, Esq.

(57) ABSTRACT

An adaptive seat belt system (10) for an automotive vehicle (12). The system (10) includes a seat belt (16) extensible about an occupant (42) of a seat system (14). A seat belt tension sensor (18) is coupled to the seat belt (16) and generates a seat belt tension signal. A seat belt actuator (20) is mechanically coupled to the seat belt (16) and adjusts tension of the seat belt (16). A controller (26) is electrically coupled to the tensioner sensor (18) and the actuator (20). The controller (26) generates a seat belt tension adjustment signal in response to the seat belt tension signal and adjusts tension of the seat belt (16) in response to the seat belt tension adjustment signal. A method for performing the same is also provided.

22 Claims, 2 Drawing Sheets

ADAPTIVE SEAT BELT TENSIONING SYSTEM

RELATED APPLICATION

The present invention is related to U.S. Provisional Application serial number 60/253,317 Ser. Nos. 60/274,882 and 60/239,066 entitled entitled "Electronically controlled four corner real-time seat adjustment system", "Electronically controlled adaptive seat adjustment system with occupant detection", "Electronically controlled adaptive seat adjustment system", and "Dynamic seat controller" filed together as on Nov. 27, 2001 and incorporated by reference herein.

TECHNICAL FIELD

The present invention relates generally to automotive vehicle systems, and more particularly, to a method and apparatus for adaptively adjusting seat belt tension during vehicle operation.

BACKGROUND OF THE INVENTION

Active seat systems experience real-time seat movement due to various automotive vehicle maneuvers. An occupant of an active seat system may be subject to real-time seat belt forces that vary in response to range and type of movement of the occupant in the seat system. The varying seat belt forces can become unpleasant to the occupant.

Traditional seat systems are capable of being translated in a fore and aft direction or in an upward and downward direction relative to a vehicle frame. An active seat system incorporates additional mobility by incorporating 4-point actuation, such that the seat system is also capable of tilting in multiple directions about a center point. The center point is located at approximately center between 4-actuators, each actuator is located at an outer base corner of the active seat system.

The all-encompassing mobility of the active seat system is used to aid in counteracting imputed forces on an occupant during vehicle maneuvering. For example, as the vehicle is performing a right turn, the active seat system tilts to the right to offset side forces experienced by an occupant of the vehicle. Instead of the occupant leaning into the turn or physically resisting the lateral forces while in the turn, a portion of the lateral forces are distributed into the active seat system. Similar, active seat system movement is experienced during other vehicle maneuvers including accelerations and braking.

An occupant wearing a seat belt is normally fixed within a seat system. The seat belt is rigidly mounted directly to a vehicle frame, or to a seat frame, which in turn is rigidly mounted to the vehicle frame. The movements of the active seat system during vehicle maneuvering can cause belt pressure on the occupant, which may be discomforting. As the seat system tilts and presses an occupant against the seat belt, any slack in the seat belt decreases and tension of the seat belt increases. The increase in seat belt tension causes the undesirable discomfort experienced by the occupant.

The increase in seat belt tension typically occurs and is most prevalent when the active seat system moves in a forward or upward direction, thereby pressing the occupant tighter against the seat belt.

Multiple energy management systems and vehicle collision systems have been introduced in the past for absorbing energy during a collision, whereby seat belt tension is adjusted during a collision event. These prior systems use collision sensors, which are utilized in determining probability of a collision. In response to the probability of the collision and other vehicle parameters and occupant characteristics, a seat belt pretensioner is activated and seat belt tension is adjusted accordingly. Many pretensioning devices are one-time use devices in that they are triggered during or immediately proceeding a collision and are not reusable. The past systems are incapable of counteracting varying seat belt tensions experienced during normal operating conditions, which do not involve collision prediction and injury prevention.

It would therefore be desirable to develop a technique for adjusting seat belt tension during vehicle maneuvers as to prevent undesirable pressure or discomfort on a vehicle occupant.

SUMMARY OF THE INVENTION

The present invention provides a method and apparatus for adaptively adjusting seat belt tension during vehicle operation. An adaptive seat belt system for an automotive vehicle is provided. The system includes a seat belt extensible about an occupant of a seat system. A seat belt tension sensor is coupled to the seat belt and generates a seat belt tension signal. A seat belt actuator is mechanically coupled to the seat belt and adjusts tension of the seat belt. A controller is electrically coupled to the seat belt tension sensor and the seat belt actuator. The controller generates a seat belt tension adjustment signal in response to the seat belt tension signal and adjusts tension of the seat belt in response to the seat belt tension adjustment signal. A method for performing the same is also provided.

One of several advantages of the present invention is the ability to adjust seat belt tension, during vehicle operation, to compensate for seat system movement. The ability to adjust seat belt tension decreases the potential for seat belt discomfort due to seat system movement, especially for active seat systems.

Another advantage of the present invention is that in adjusting seat belt tension, vehicle dynamics, occupant characteristics, and seat system position are considered, thereby, providing seat belt tension determination system for various operating conditions and occupant characteristics. Thus, the system can potentially provide increased occupant safety by maintaining adequate seat belt tension on a vehicle occupant.

Furthermore, the present invention unlike traditional seat belt systems that utilize single use pretensioning devices, the present invention provides active seat belt tension adjustment that is capable of increasing or decreasing seat belt tension continuously during various vehicle operating conditions.

The present invention itself, together with attendant advantages, will be best understood by reference to the following detailed description, taken in conjunction with the accompanying figures.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION OF THE PREFERRED EMBODIMENT

Figure 1:
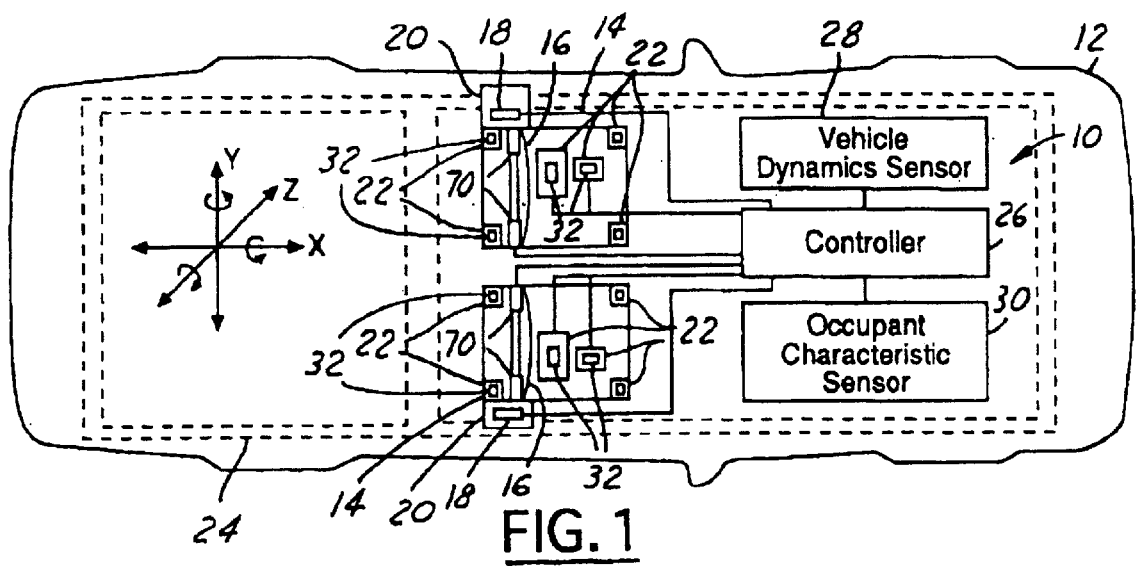
FIG. 1 is a block diagrammatic view of an adaptive seat belt system for an automotive vehicle in accordance with an embodiment of the present invention.

In each of the following figures, the same reference numerals are used to refer to the same components. While the present invention is described with respect to a method and apparatus for adaptively adjusting seat belt tension during vehicle operation, the present invention may be adapted to be used in various systems including: automotive vehicle systems, control systems, hybrid-electric vehicle systems, or other applications utilizing an active or adjustable seat system.

In the following description, various operating parameters and components are described for one constructed embodiment. These specific parameters and components are included as examples and are not meant to be limiting.

Referring now to FIG. 1, a block diagrammatic view of an adaptive seat belt system 10 for an automotive vehicle 12 in accordance with an embodiment of the present invention is shown. The system 10 includes one or more seat systems 14, each seat system 14 having a corresponding seat belt 16. Each seat belt 16 is coupled to a seat belt tension sensor 18 and a seat belt actuator 20. The seat systems 14 are active seat systems, in that they are capable of being actuated by multiple seat system actuators 22, in multiple directions relative to a vehicle frame 24. A controller 26 is electrically coupled to the tension sensors 18, the belt actuators 20, and the seat system actuators 22 as well as to other vehicle components such as a vehicle's dynamic sensor 28 and an occupant characteristic sensor 30. As the vehicle 12 is operated the tension sensors 18, the dynamics sensor 28, and the occupant characteristic sensor 30 are monitored by the controller 26. During vehicle dynamics as the seat systems 14 are actuated in various directions the controller 26 generates a seat belt tension adjustment signal in response to vehicle dynamics, occupant characteristics, and current tension of the seat belts 16 to adjust seat belt tension via the belt actuators 20.

The tension sensor 18 may be a load cell, a strain gage, or other tension sensor known in the art. The tension sensor 18 may include multiple tension sensors that are located in an isolated portion of the seat belt 16 or may be distributed to various locations on the seat belt 16 to measure distributed tension levels throughout length of the seat belt 16.

The belt actuators 20 perform the function of a seat belt retractor as well as additional functions to compensate for seat belt tension fluctuations due to movement of the seat system 14. The belt actuators 20 are active unlike a seat belt retractor in that the belt actuators 20 are capable of retracting and extending the seat belt throughout vehicle operation and may continuously perform adjustments therein.

Seat system actuators 22 are similar to seat system actuators known in the art. The seat system actuators include directional position sensors 32. The directional position sensors 32 are used to determine the position of the seat system 14 axially in X, Y, and Z directions as well as rotationally about the X, Y, and Z axis. The directional position sensors 32 may be of encoder style, infrared style, potentiometer style, or of other style known in the art.

The controller 26 is preferably microprocessor based such as a computer having a central processing unit, memory (RAM and/or ROM), and associated input and output buses.

The controller 26 may be a portion of a central vehicle main control unit, an interactive vehicle dynamics module, a restraints control module, a main safety controller, or a stand-alone controller.

The vehicle dynamics sensor 28 may be a single sensor or a conglomerate of various vehicle sensors including: a brake sensor, a throttle sensor, an inertial sensor, a steering sensor, a suspension sensor, a vehicle inertial sensor, a wheel speed sensor, a vehicle speed sensor, accelerometers, a pedal sensor, a seat track sensor, a steering column sensor, or other vehicle sensor. The inertial sensor may allow the system 10 to determine roll, pitch, and yaw of the vehicle 12 or of a vehicle component in the X, Y, and Z directions. The accelerometers may be remote accelerometers located near the outer contact surfaces of the vehicle 12 as to measure immediate collision accelerations or local accelerometers located at various internal vehicle locations as to measure internal accelerations. The above sensors may be used individually, separately, or in conjunction with each other. They may also be used for multiple purposes for example in generating the seat belt tension adjustment signal or in generating other various signals.

The occupant characteristic sensor 30 may also be a single sensor or a conglomerate of various vehicle sensors including sensors such as: an occupant position sensor, a seat belt sensor, an occupant characteristic sensor, accelerometers, or other various sensors known in the art. The occupant characteristic sensor 30 generates an occupant characteristic signal that may include weight of an occupant, height of an occupant, position of an occupant relative to the seat system 14, or other various occupant characteristics, known in the art.

Figure 2:
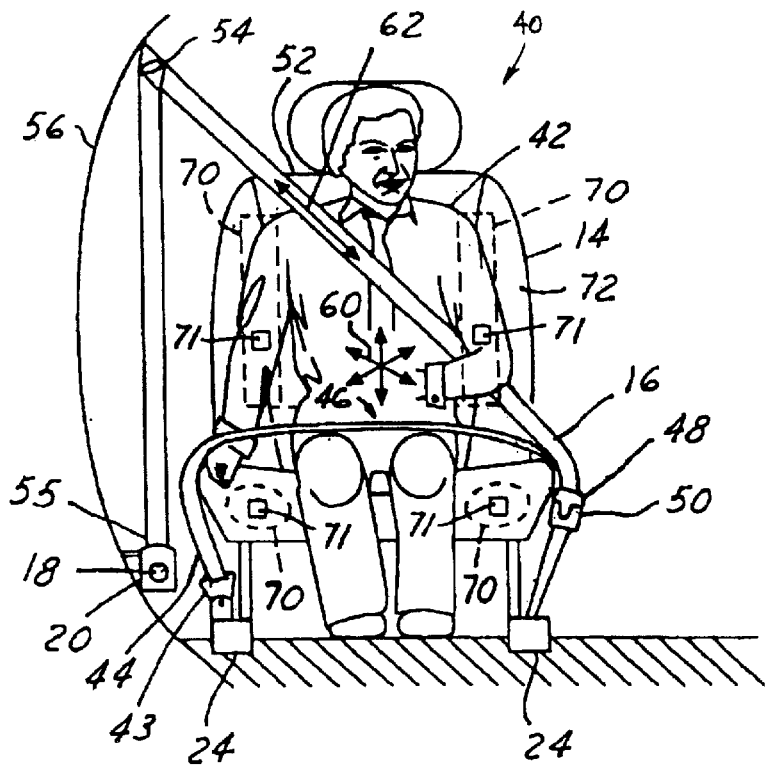
FIG. 2 is a front view of an occupied seat system utilizing the adaptive seat belt system in accordance with an embodiment of the present invention.

Referring now to FIG. 2, a front view of an occupied seat system 40 utilizing the adaptive seat belt system 10 in accordance with an embodiment of the present invention, is shown. The occupied seat system 40 includes an occupant 42 seat belted into the seat system 14. The seat belt 16 is extensible about the occupant 42 and is anchored, by a seat belt anchor 43, to the frame 24, on a first end 44. The seat belt 16 is guided over a lap 46 of the occupant 42, to a seat belt buckle 48, which is clasped to a receptacle 50 and also anchored to the frame 24. The seat belt 16 is then guided over a shoulder 52 of the occupant 42 through a seat belt adjuster 54, mounted to a vehicle body 56, and finally to the tension sensor 18 and the belt actuator 20 at a second end 55, which are also mounted to the vehicle body 56. Of course, the seat belt anchor 43, the seat belt adjuster 54, the tension sensor 18, and the belt actuator 20 may be mounted at various locations within the vehicle 12 and may also be actuated and repositioned in conjunction with positioning of the seat system 14. For example, as the seat system 14 is actuated in a forward direction the controller 26 may compensate by moving the belt actuator 20 in a forward direction.

The seat system 14 may be actuated, as stated above, in various directions, represented by arrows 60. During vehicle operation as the seat system 14 causes tension within the seat belt 16 to change over time, the system 10 adjusts seat belt tension by retracting or extending the length of the seat belt 16, via the actuator 20, as represented by arrows 62. The seat belt adjustments may be performed continuously during vehicle operation including the following vehicle operating conditions and situations: vehicle steering, vehicle accelerations, vehicle braking, a vehicle collision, an apprehension of a vehicle collision, or various other vehicle operating conditions and situations.

Referring now to FIGS. 1 and 2, the seat system 14 may also include seat bolsters 70 and seat bolster actuators 71.

Seat bolsters 70 may respond both in the y and/or z directions in response to vehicle dynamics, via the seat bolster actuators 71. The seat bolster actuators may include electrical motors, mechanical linkages, pneumatics, or other devices known in the art. Also in determining seat bolster positioning force sensors may be used, current may be monitored of an electric motor, or other position sensing device or method may be used.

The controller 26 when compensating for active seat bolster movement, may adjust seat belt tension with actuator 20 in response to change in occupant and/or seat orientation, at least a portion of which may be measured by actuator sensor 18. For example, when the vehicle 12 is experiencing lateral acceleration from a turning maneuver, the occupant 42 may experience side forces in the y axis direction. The seat bolsters 70, in response to the side forces respond inward accordingly and return to a corresponding seat bolster base position following the completion of the turning maneuver. During the event, seat belt tension experienced by the occupant 42 in seat belt 16 increases and may inhibit proper movement of the active seat system 14 causing occupant 42 to experience uncomfortable seat belt tension. Controller 26 compensates for the increased seat belt tension by relieving seat belt tension through partial release or extension of seat belt 16 as represented by arrows 62. Upon conclusion of the vehicle turning maneuver, seat bolsters 70 return outward to the corresponding seat bolster base position accordingly and seat belt tension also returns to a corresponding seat belt base position by retraction of seat belt 16 represented by arrows 62.

Figure 3:
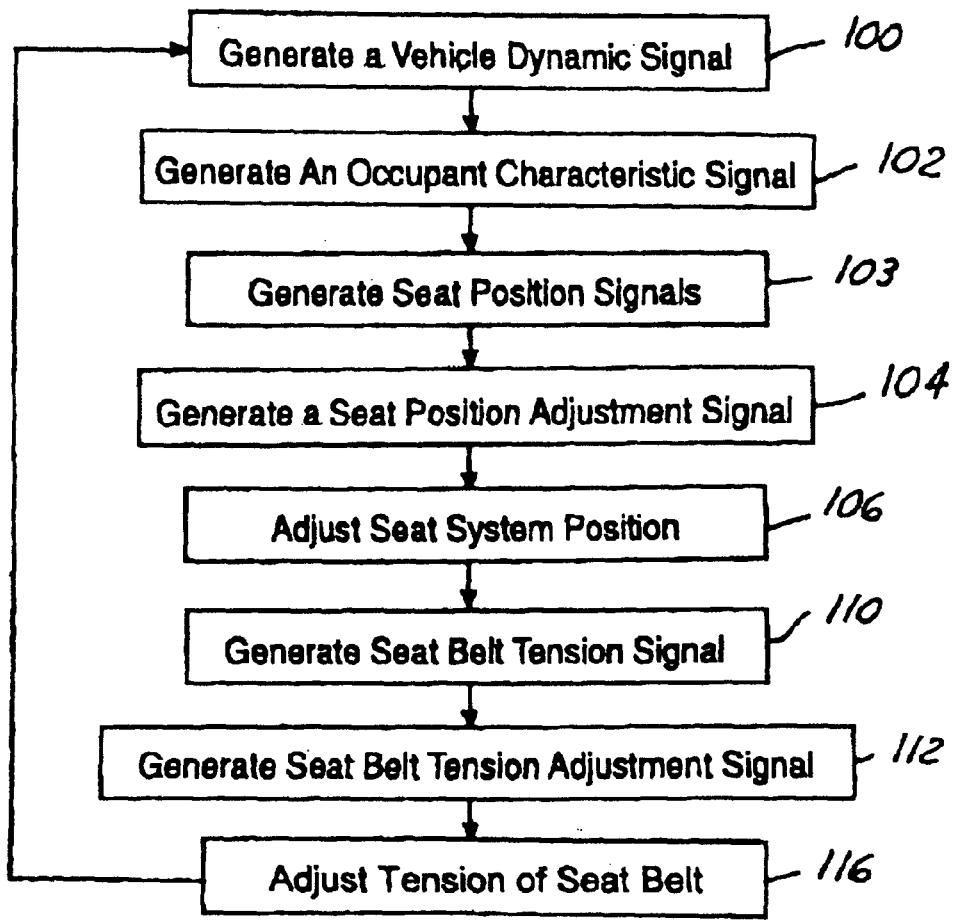
FIG. 3 is a logic flow diagram illustrating a method of adaptively adjusting tension of a seat belt within the automotive vehicle in accordance with an embodiment of the present invention.

Referring now to FIG. 3, a logic flow diagram illustrating a method of adaptively adjusting tension of a seat belt within the automotive vehicle in accordance with an embodiment of the present invention, is shown.

In step 100, the dynamics sensor 28 generates a vehicle dynamics signal in response to a dynamic parameter of the vehicle 12. The dynamic parameter may be generated due to any of the above stated conditions or situations. The dynamic parameter may, as in the following example, correspond to vehicle deceleration, in which case the dynamic parameter includes a deceleration value. The deceleration example is further described throughout the following steps and is meant only to aid in the understanding of the present invention, multiple other scenarios are also contemplated.

In step 102, the occupant characteristic sensor 30 determines an occupant characteristic and generates an occupant characteristic signal. The occupant 42 has multiple characteristics including: being male or female, being of various size and shape, and being in various seated positions on the seat system 14, for example. The occupant characteristic sensor generates the occupant characteristic signal in response to one or more of the stated characteristics.

In step 103, the directional position sensors 32 generate seat position signals. The seat position signals correspond to the above stated potential axial and rotational existing positions of the seat system 14.

In step 104, the controller 26 generates a seat position adjustment signal and may also generate a seat bolster adjustment signal in response to the vehicle dynamics signal, the occupant characteristic signal, and the seat position signals.

In step 106, the seat system actuators 22 adjust the position of the seat system 14 and the seat bolsters 70 in response to the seat position adjustment signal and the seat bolster adjustment signal, respectively.

In step 110, the tension sensor 18 determines tension of the seat belt 16 and generates a seat belt tension signal. The tension of the seat belt 16 may fluctuate depending upon various conditions and situations. For example, as the vehicle 12 is decelerating such as during braking the seat belt tension is increasing. When the vehicle 12 is steered around a curve the seat system 14 is tilted in a left or in a right direction to compensate for lateral forces experienced by the occupant 42, thereby causing seat belt tension to fluctuate. The tension sensor 18 may generate the seat belt tension signal in response to the fluctuations in seat belt tension or may continuously generate the seat belt tension signal.

In step 112, the controller 26 generates the seat belt tension adjustment signal in response to a reference seat belt tension. The controller 26 compares an existing seat belt tension, from the seat belt tension signal, with the reference seat belt tension and adjusts the existing seat belt tension to approximately equal the reference seat belt tension. In a preferred embodiment of the present invention, the reference seat belt tension is approximately equal to tension of the seat belt 16 when the occupant 42 latches the buckle 48 to the receptacle 50 or some time soon thereafter, to allow for adjustment of the seat belt 16. Of course, the reference seat belt tension may also be set at other times during other conditions or situations.

In step 116, the belt actuator 20 receives the seat belt tension adjustment signal and performs generally one of three functions: retracts the seat belt 16 to increase seat belt tension, extends the seat belt 16 to decrease seat belt tension, or maintains length of the seat belt 16 to maintain a current seat belt tension. Upon adjusting tension of the seat belt 16, the controller 26 may return to step 110 to confirm that the existing seat belt tension is approximately equal to the reference seat belt tension, return to step 100 to reevaluate positions of the seat system 14 and the bolsters 70, or a combination thereof.

The above-described steps are meant to be an illustrative example, the steps may be performed synchronously or in a different order depending upon the application.

The present invention therefore provides a seat belt tension adjustment system that is active in that seat belt tension is capable of being adjusted continuously throughout vehicle operation in various conditions and situations. The present invention provides a seat belt system that compensates for active seat system movements and is therefore more desirable to a vehicle occupant. The present invention also potentially increases safety of a vehicle by maintaining an appropriate seat belt tension for a given occupant in a particular driving condition and situation.

The above-described apparatus, to one skilled in the art, is capable of being adapted for various purposes and is not limited to the following systems: automotive vehicle systems, control systems, hybrid-electric vehicle systems, or other applications utilizing an active or adjustable seat system. The above-described invention may also be varied without deviating from the spirit and scope of the invention as contemplated by the following claims.

What is claimed is:

1. An adaptive seat belt system for an automotive vehicle comprising:

a seat belt extensible about an occupant of a seat system;

a seat belt tension sensor coupled to said seat belt and generating a seat belt tension signal;

a seat belt actuator mechanically coupled to said seat belt for adjusting tension of said seat belt;

a controller electrically coupled to said seat belt tension sensor and said seat belt actuator, said controller generating a seat belt tension adjustment signal in response to said seat belt tension signal and adjusting tension of said seat belt in response to said seat belt tension adjustment signal;

a vehicle dynamic sensor electrically coupled to said controller and generating a vehicle dynamic signal; and said controller adjusting position of at least a portion of said seat system in response to said vehicle dynamic signal.

2. A seat belt system as in claim 1 further comprising one or more seat system actuators mechanically coupled to said seat system and electrically coupled to said controller, said controller adjusting position of said seat system relative to a vehicle frame in response to said vehicle dynamic signal.

3. A system as in claim 1 further comprising:

at least one seat bolster; and at least one seat bolster actuator coupled to said at least one seat bolster;

said controller electrically coupled to said at least one seat bolster actuator and adjusting position of said at least one seat bolster in response to said vehicle dynamic signal.

4. A system as in claim 1 further comprising:

at least one seat bolster; and at least one seat bolster actuator coupled to said at least one seat bolster;

said controller electrically coupled to said at least one seat bolster actuator and adjusting position of said at least one seat bolster in response to said occupant characteristic signal.

5. An adaptive seat belt system for an automotive vehicle comprising:

a seat belt extensible about an occupant of a seat system;

a seat belt tension sensor coupled to said seat belt and generating a seat belt tension signal;

a seat belt actuator mechanically coupled to said seat belt and adjusting tension of said seat belt;

one or more seat system actuators mechanically coupled to said seat system;

one or more directional position sensors electrically coupled to said one or more seat system actuators and generating one or more seat position signals; and a controller electrically coupled to said seat belt tensioner, said seat belt actuator, said one or more seat system actuators, and said one or more directional position sensors, said controller generating a seat belt tension adjustment signal in response to said seat belt tension signal and adjusting tension of said seat belt in response to said seat belt tension adjustment signal.

6. A seat belt system as in claim 5 further comprising:

a vehicle dynamic sensor electrically coupled to said controller and generating a vehicle dynamic signal;

said controller adjusting position of said seat system relative to a vehicle frame and in response to said vehicle dynamic signal.

7. A system as in claim 5 further comprising:

an occupant characteristic sensor electrically coupled to said controller and generating an occupant characteristic signal;

said controller adjusting position of said seat system relative to a vehicle frame and in response to said occupant characteristic signal.

8. A system as in claim 7 wherein said occupant characteristic signal comprising at least one of the following: a weight value, a height value, or position indication of said occupant relative to a seat system.

9. A system as in claim 5 further comprising:

at least one seat bolster;

at least one seat bolster actuator coupled to said at least one seat bolster; and a vehicle dynamic sensor electrically coupled to said controller and generating a vehicle dynamic signal;

said controller electrically coupled to said at least one seat bolster actuator and adjusting position of said at least one seat bolster in response to said vehicle dynamic signal.

10. A system as in claim 5 further comprising:

at least one seat bolster;

at least one seat bolster actuator coupled to said at least one seat bolster; and an occupant characteristic sensor electrically coupled to said controller and generating an occupant characteristic signal;

said controller electrically coupled to said at least one seat bolster actuator and adjusting position of said at least one seat bolster in response to said occupant characteristic signal.

11. A system as in claim 5 wherein said controller compares said seat belt tension signal with a reference seat belt tension and adjusts tension of said seat belt to approximately equal said reference seat belt tension.

12. A method for adaptively adjusting tension of a seat belt within an automotive vehicle comprising:

determining tension of a seat belt and generating a seat belt tension signal;

generating a seat belt tension adjustment signal in response to said seat belt tension signal;

adjusting tension of said seat belt in response to said seat belt tension adjustment signals;

generating a vehicle dynamics signal; and adjusting position of at least a portion of said system in response to said vehicle dynamic signal.

13. A method as in claim 12 further comprising:

adjusting seat position in response to said vehicle dynamics signal; and generating said seat belt tension signal upon adjusting seat position.

14. A method as in claim 12 further comprising:

adjusting position of at least one seat bolster in response to said vehicle dynamics signal; and generating said seat belt tension signal upon adjusting position of said at least one seat bolster.

15. An adaptive seat belt system for an automotive vehicle comprising:

a seat belt extensible about an occupant of a seat system;

a seat belt tension sensor coupled to said seat belt and generating a seat belt tension signal;

a seat belt actuator mechanically coupled to said seat belt for adjusting tension of said seat belt;

a controller electrically coupled to said seat belt tension sensor and said seat belt actuator, said controller generating a seat belt tension adjustment signal in response to said seat belt tension signal and adjusting tension of said seat belt in response to said seat belt tension adjustment signal;

an occupant characteristic sensor electrically coupled to said controller and generating an occupant characteristic signal; and said controller adjusting position of at least a portion of said seat system in response to said occupant characteristic signal.

16. A system as in claim 15 further comprising one or more seat system actuators mechanically coupled to said seat system and electrically coupled to said controller, said controller adjusting position of said seat system in response to said occupant characteristic signal.

17. A system as in claim 15 wherein said occupant characteristic signal comprising at least one of the following: a weight value, a height value, or position indication of said occupant relative to a seat system.

18. A system as in claim 1 or 15 wherein said controller compares said seat belt tension signal with a reference seat belt tension and adjusts tension of said seat belt to approximately equal said reference seat belt tension.

19. A method for adaptively adjusting tension of a seat belt within an automotive vehicle comprising:

determining tension of a seat belt and generating a seat belt tension signal;

generating a seat belt tension adjustment signal in response to said seat belt tension signal;

adjusting tension of said seat belt in response to said seat belt tension adjustment signal;

generating an occupant characteristic signal; and adjusting position of at least a portion of a seat system in response to said occupant characteristic signal.

20. A method as in claim 19 further comprising:

adjusting seat position in response to said occupant characteristic signal; and generating said seat belt tension signal upon adjusting seat position.

21. A method as in claim 19 further comprising:

adjusting position of at least one seat bolster in response to said occupant characteristic signal; and generating said seat belt tension signal upon adjusting position of said at least one seat bolster.

22. A method as in claim 12 or 19 further comprising:

comparing said seat belt tension signal with a reference seat belt tension; and adjusting said seat belt tension to approximately equal said reference seat belt tension.

* * * * *